United States Patent
Gregory et al.

(10) Patent No.: US 7,777,666 B2
(45) Date of Patent: Aug. 17, 2010

(54) CELESTIAL BODY MAPPING SYSTEMS AND METHODS

(75) Inventors: William Gregory, Gilbert, AZ (US);
Mitch Fletcher, Glendale, AZ (US);
Randy Black, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/133,154

(22) Filed: Jun. 4, 2008

(65) Prior Publication Data
US 2009/0303110 A1 Dec. 10, 2009

(51) Int. Cl.
*G01S 13/90* (2006.01)
*G01S 13/00* (2006.01)
*G01S 13/89* (2006.01)

(52) U.S. Cl. .............. 342/25 A; 342/25 R; 342/42; 342/43; 342/175; 342/176; 342/179; 342/190; 342/191; 342/195

(58) Field of Classification Search .......... 341/50; 701/200, 207, 213–216; 342/25 R–25 F, 342/52–66, 118, 120–122, 175, 176, 179, 342/190–197, 357.01–357.17, 21, 22, 27–51, 342/125
See application file for complete search history.

(56) References Cited

U.S. PATENT DOCUMENTS

| | | | |
|---|---|---|---|
| 3,072,818 A * | 1/1963 | Raffensperger | 342/176 |
| 3,242,484 A * | 3/1966 | Russell | 342/191 |
| 3,624,650 A * | 11/1971 | Paine et al. | 342/194 |
| 4,045,795 A * | 8/1977 | Fletcher et al. | 342/25 E |
| 4,163,231 A * | 7/1979 | Zuerndorfer et al. | 342/25 A |
| 4,292,634 A * | 9/1981 | Frosch et al. | 342/25 A |
| 4,727,373 A * | 2/1988 | Hoover | 342/25 F |
| 4,910,520 A * | 3/1990 | Rosen et al. | 342/25 A |
| 5,051,749 A * | 9/1991 | Stoyle | 342/25 A |
| 5,191,344 A * | 3/1993 | Moreira | 342/25 A |
| 5,469,167 A * | 11/1995 | Polge et al. | 342/25 A |
| 5,552,787 A * | 9/1996 | Schuler et al. | 342/25 A |
| 5,661,477 A * | 8/1997 | Moreira et al. | 341/50 |

(Continued)

OTHER PUBLICATIONS

"ENVI Tutorial: Landsat TM and SAR Data Fusion"; no author listed; no date listed; posted on the Internet at ittvis.com.*

(Continued)

*Primary Examiner*—Bernarr E Gregory
(74) *Attorney, Agent, or Firm*—Ingrassia Fisher & Lorenz, P.C.

(57) ABSTRACT

Systems and methods for mapping a surface of a celestial body containing objects and terrain are provided. One system includes a Synthetic Aperture RADAR (SAR) module configured to capture a high-resolution image of the terrain of at least a portion of the surface and a map module configured to store map data representing the portion of the surface. The system also includes a fusion module configured to combine the high-resolution image and the map data to generate a high-resolution map of the portion of the surface. A method includes orbiting the celestial body, capturing, via the SAR module, a high-resolution image during each orbit, and fusing the captured high-resolution image with a low-resolution map of the surface to generate a high-resolution map of the surface. A computer-readable medium for storing instructions that cause a processor to perform the above method is also provided.

17 Claims, 2 Drawing Sheets

U.S. PATENT DOCUMENTS

| | | | | |
|---|---|---|---|---|
| 5,666,121 | A | * | 9/1997 | Fang et al. ................ 342/25 A |
| 5,801,970 | A | * | 9/1998 | Rowland et al. .............. 342/63 |
| 5,969,662 | A | * | 10/1999 | Hellsten ................... 342/25 A |
| 6,452,532 | B1 | * | 9/2002 | Grisham ................... 342/25 C |
| 6,864,828 | B1 | * | 3/2005 | Golubiewski et al. ..... 342/25 C |
| 6,922,632 | B2 | * | 7/2005 | Foxlin ........................ 701/207 |
| 7,248,342 | B1 | * | 7/2007 | Degnan ..................... 342/120 |
| 2004/0073360 | A1 | * | 4/2004 | Foxlin ........................ 701/207 |

OTHER PUBLICATIONS

A. Garzelli, "Wavelet-Based Fusion of Optical and SAR Image Data over Urban Area"; from the proceedings of "Photogrammetric Computer Vision: ISPRS Commission III, Symposium 2002," held in Graz, Austria in the year 2002.*

S.M. Hsu et al., "Multisensor Fusion with Hyperspectral Imaging Data: Detection and Classification"; Lincoln Laboratory Journal; vol. 14, No. 1, 2003; pp. 145-159.*

* cited by examiner

US 7,777,666 B2

CELESTIAL BODY MAPPING SYSTEMS AND METHODS

TECHNICAL FIELD

The present invention generally relates to mapping, and more particularly relates to mapping the surface of a celestial body.

BACKGROUND

On Jul. 20, 1969, Neil Armstrong and Edwin E. "Buzz" Aldrin landed the Apollo 11 Eagle Lunar Module on the Moon. Just prior to the lunar landing, Neil Armstrong noticed that the lunar module autopilot was going to land the lunar module in a boulder field. In response thereto, Neil Armstrong switched OFF the autopilot and manually landed the lunar module in a safer area only seconds before the lunar module ran out of fuel. The reason the autopilot was headed for the boulder field was due to the fact that the surface of the Moon had only been mapped using equipment (i.e., telescopes) located on Earth or located on spacecraft orbiting the Moon during earlier Apollo missions, and did not contain sufficiently detailed lunar surface information.

Presently, maps of the Moon's surface are still relatively primitive in that they are limited to the maps used during the Apollo Space Program and to maps generated using modern equipment located on Earth and/or in man-made satellites orbiting Earth. In other words, current lunar surface maps still do not include detailed enough information to enable an autopilot to safely choose and land a lunar module on the Moon. Furthermore, the surface of the Moon is not being monitored in order to record any changes in the surface of the Moon, and specifically, the change in location of natural objects (e.g., rocks) and made-made objects. These changes may need to be tracked in real-time during, for example, manned or unmanned missions to the Moon, which are scheduled to begin starting in the year 2020.

The lack of detailed surface information is even more problematic with Mars. That is, because 1) the Earth is considerably farther away from Mars than from the Moon; 2) there have been relatively few unmanned missions to Mars; and 3) there have not been any previous manned missions to Mars, the surface maps of Mars are even less detailed than the maps of the Moon. This is problematic because manned missions to Mars are scheduled to begin in the year 2030, and there is an obvious goal of being able to accurately locate a safe place to land a space module on Mars' surface.

Accordingly, it is desirable to provide systems and methods for accurately mapping the surface of a celestial body. In addition, it is desirable to provide systems and methods for mapping changes in position of objects and terrain on the surface of the celestial body in real-time. Furthermore, other desirable features and characteristics of the present invention will become apparent from the subsequent detailed description of the invention and the appended claims, taken in conjunction with the accompanying drawings and this background of the invention.

BRIEF SUMMARY

Various embodiments provide systems for mapping a surface of a celestial body containing objects and terrain. One exemplary system comprises a Synthetic Aperture RADAR (SAR) module configured to capture a high-resolution image of the terrain of at least a portion of the surface and a map module configured to store map data representing the portion of the surface. The system also comprises a fusion module in communication with the SAR module and the map module, wherein the fusion module is configured to receive the high-resolution image and the map data, and combine the high-resolution image and the map data to generate a high-resolution map of the portion of the surface.

Methods for mapping a surface of a celestial body containing terrain and an object are also provided. An exemplary method comprises the steps of orbiting the celestial body and capturing, via a SAR module, a high-resolution image of the terrain during each orbit. The method also comprises the step of fusing the captured high-resolution image with a low-resolution map of the surface to generate a high-resolution map of the surface.

Various embodiments also provide a computer-readable medium storing instructions that, when read by a processor, cause the processor to perform a method comprising the step of capturing, via a SAR module, a high-resolution image of a terrain of at least a portion of a surface a celestial body during a plurality of orbits around the celestial body. The computer-readable medium also stores instructions that cause the processor to perform the step of fusing the captured high-resolution image with map data representing the portion of the surface to generate a high-resolution map of the surface.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments of the invention provide systems and methods for mapping the surface of a celestial body (e.g., a planet (not the Earth), a moon, or other similar celestial bodies). Other embodiments provide systems and methods for mapping real-time changes in position of objects and terrain on the surface of the celestial body.

Figure 1:
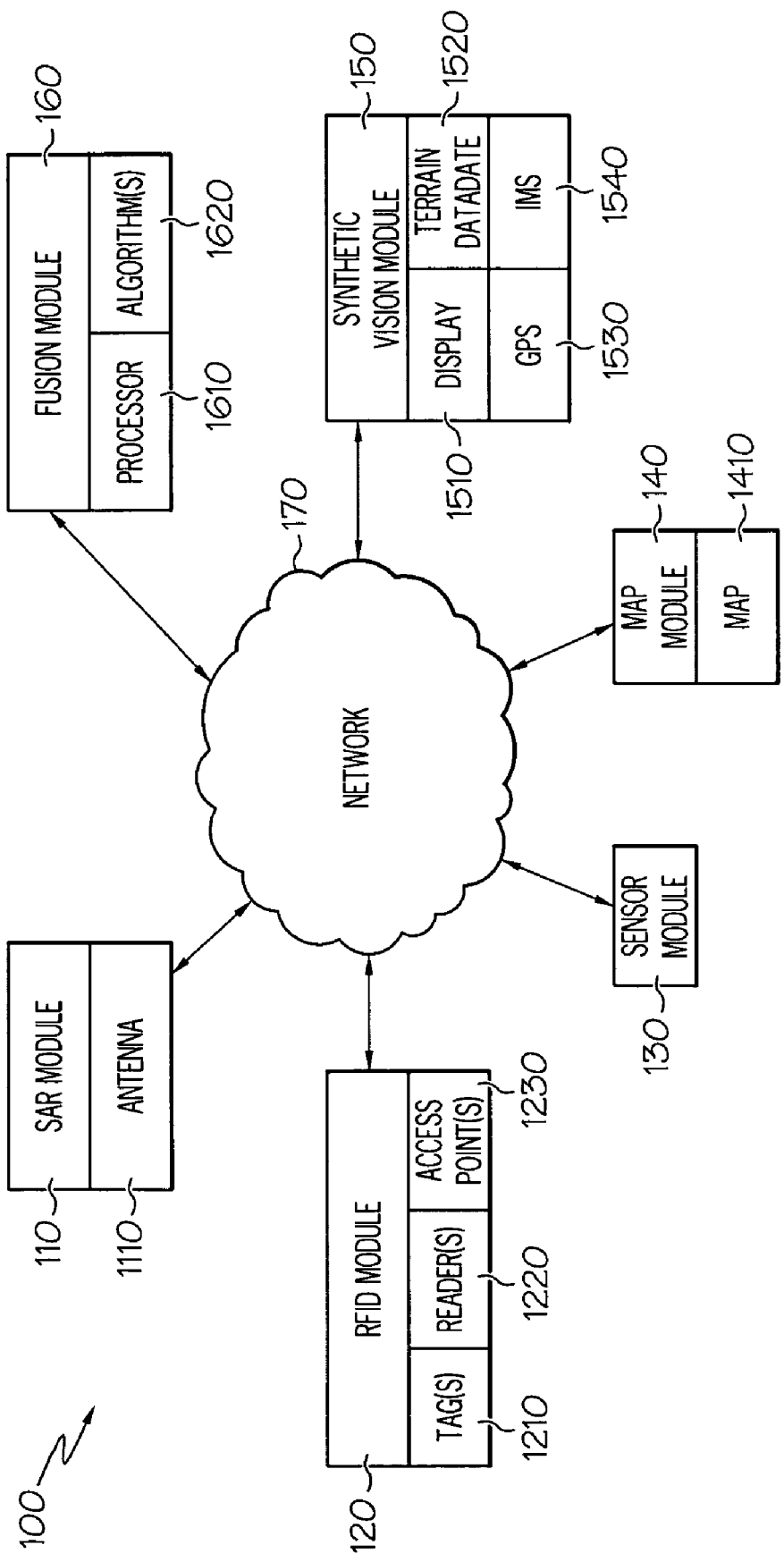
FIG. 1 is a block diagram of one exemplary embodiment of a system for mapping a surface of a celestial body.

Turning now to the figures, FIG. 1 is a block diagram of a system 100 for mapping the surface of a celestial body. System 100 comprises a Synthetic Aperture RADAR (SAR) module 110, a radio frequency identification (RFID) module 120, a sensor module 130, a map module 140, and a synthetic vision module 150, all in communication with a fusion module 160 via a network 170 (e.g., a local area network LAN) that is wireless, although portions of network 170 may couple one or more components of system 100 via wired communication technology.

SAR module 110 may include any combination of device (s), software, and hardware component(s) capable of using electromagnetic waves to generate/capture a high-resolution image of a geographic area from a moving platform (e.g., a spacecraft, a space station, a satellite, etc.). SAR technology is known in the art and the particulars of SAR technology will not be discussed herein in detail; however, the application of SAR technology in accordance with various embodiments of SAR module 110 is discussed below.

In one embodiment, SAR module 110 is configured to generate a two-dimensional (2-D) image of a pre-determined geographic area on, for example, the Moon, Mars, or other celestial body. One dimension in the generated image is called range (or cross track) and is a measure of the "line-of-sight" distance from the RADAR to the geographic area. Range measurement and resolution are achieved in Synthetic Aperture RADAR in a manner similar to other RADAR technologies. That is, range is determined by precisely measuring the time from transmission of an electromagnetic pulse to receiving the echo from various terrain features (e.g., mountains, valleys, hills, canyons, plains, etc.) in the geographic area and object(s) (e.g., structures, vehicles, etc.) located within the geographic area. The range resolution is determined by the transmitted pulse width, meaning that narrow pulses yield high range resolution and wide pulses yield low range resolution. Various embodiments of SAR module 110 may use any pulse width depending on the particular application of system 100, although SAR module 110 preferably utilizes a narrow pulse width for surface mapping of the Moon or Mars.

The other dimension in the generated image is called azimuth, which is perpendicular to the range. To obtain fine azimuth resolution, in one embodiment, SAR module 110 includes a physically large antenna 1110 configured to focus the transmitted and received energy into a sharp beam (see FIG. 2), although SAR module 110 may include more than one antenna 1110. Each antenna 1110 preferably includes a diameter less than about ⅓ meters and a height less than about ⅕ meters. Since the sharpness of the beam defines the azimuth resolution, SAR module 110 may utilize an antenna having any diameter and/or height appropriate for a particular application of system 100. Specifically, SAR module 110 may include one or more antennas 1110 that are larger than the above-identified diameters and heights.

Achieving fine azimuth resolution may also be described from a Doppler processing viewpoint. That is, the position of the geographic area along the flight path or orbit determines the Doppler frequency of its echoes. Geographic area ahead of the moving platform produces a positive Doppler offset, while geographic area behind the moving platform produces a negative offset. As the moving platform flies a distance (i.e., the synthetic aperture), echoes are resolved into a number of Doppler frequencies. The Doppler frequency of the various terrain features of the geographic area and/or objects located within the geographic area determines the azimuth position of each terrain feature or object.

Further to the general discussion above, it is noted that because the range to each terrain feature and object on the synthetic aperture changes along the synthetic aperture, the energy reflected from the terrain features and objects should be "mathematically focused" to compensate for the range dependence across the aperture prior to image formation. Additionally, in fine-resolution applications of SAR module 110, the range and azimuth processing is dependent upon one another, which also increases the amount of computational processing needed to accurately generate/capture a high-resolution image of the geographic area.

RFID module 120 may be any system, device, hardware, software, or combination thereof configured to identify the location of an object or asset. This capability keeps track of objects/assets that change position faster than the mapping capabilities provided by SAR module 110 discussed above. As will be discussed in more detail below, such objects or assets may be located on the surface of a celestial body that is being mapped. RFID module 120 may utilize one or more RF technologies (e.g., 802.11 specifications, RFID specifications, ultra wideband (UWB) specifications, WiFi specifications, WiMAX specifications, and the like RF technologies) in identifying such locations.

As illustrated in FIG. 1, RFID module 120 includes one or more tags 1210, one or more tag readers 1220, one or more access points 1230, and/or other components that may be included within an RFID system. Tag(s) 1210 may be any type of tag (e.g., active RFID tags, passive RFID tags, semi-active RFID tags, etc.) implementing one or more of the above RF technologies. As such, tag reader(s) 1220) access point(s) 1230, and any other component included within RFID module 120 communicates with one another and/or with RFID tag reader, a WiFi tag reader, a WiMAX tag reader, a UWB tag reader, a 802.11 tag reader, a Zigbee tag reader, and the like tag reader, and access point(s) 1230 are configured to enable RFID module 120 to communicate with one or more external computing devices (e.g., processor 1610, discussed below).

Sensor module 130 may include any system, device, hardware, software, or combinations thereof capable of detecting the location of an object on the surface of a celestial body that is being mapped. For example, sensor module 130 may utilize digital video image capturing techniques (e.g., light capturing devices, cameras, charge-coupled devices with a range from ultraviolet to infrared, etc.), RADAR, LIDAR, and the like sensors that are capable of visually, acoustically, or otherwise detecting the present location of an object (e.g., a structure, vehicle, and/or other man-made or natural objects).

Map module 140 may be any device, hardware, software, or combination thereof capable of storing map data 1410 representing a particular geographic area. In one embodiment, map data 1410 is a digital map of the surface of a celestial body, and particularly, a low-resolution map of the surface of the Moon. In accordance with one aspect of the invention, the low-resolution map of the surface of the Moon is generated from one or more maps of the Moon's surface generated during the Apollo Space Program, one or more maps of the Moon's surface generated from the Earth (e.g., via a telescope, RADAR, digital imagery, etc.), one or more maps of the Moon's surface generated from a satellite, space station, or probe orbiting the Earth, and/or the like low-resolution maps of the Moon's surface, including combinations thereof.

In another embodiment, map data 1410 is a low-resolution digital map of the surface of Mars. In accordance with one aspect of the invention, the digital map of the surface of the Mars is generated from one or more maps of Mars' surface generated from the Earth (e.g., via a telescope, RADAR, digital imagery, etc.), one or more maps of Mars' surface generated from a satellite, space station, or probe orbiting the Earth, and/or the like low-resolution maps of Mars' surface, including combinations thereof.

Synthetic vision module 150 may be any system, device, hardware, software, or combinations thereof capable of using terrain data, object data, and/or other data to provide situational awareness to the flight crew of, for example, a spacecraft. In one embodiment, Synthetic vision module 150 is a synthetic vision system manufactured by Honeywell International, Inc. of Morristown, N.J., although other embodiments may include other synthetic vision systems. Synthetic vision systems are generally known in the art and will not be discussed in detail herein; however, the operation of various embodiments of synthetic vision module 150 incorporating a synthetic vision system is discussed below.

Synthetic vision module 150, in one embodiment, includes a display 1510, one or more terrain databases 1520, and Global Positioning System (GPS) 1530 that show spacecraft flight crews where they are located with respect to the terrain/objects, and the direction in which the spacecraft is oriented. Synthetic vision module 150 further includes an integrity-monitoring system (IMS) 1540 that ensures that the information display 1510 is displaying corresponds to where the spacecraft actually is located.

In one embodiment, synthetic vision module 150 is configured to show, via display 1510, terrain, an object, an approach path, a landing site, and the like in a photorealistic display. That is, synthetic vision module 150 is configured to fuse three-dimensional (3-D) data into display 1510 such that synthetic vision module 150 is able to provide situational awareness to the flight crew.

Fusion module 160 may be any device, hardware, software, firmware, or combination thereof capable of obtaining and integrating data from SAR module 110, RFID module 120, sensor module 130, and map module 140. In one embodiment, fusion module 160 comprises a processor 1610 configured to integrate the data from SAR module 110, RFID module 120, sensor module 130, and map module 140 using information fusion techniques. Information fusion is known in the art and various embodiments of fusion module 160 may include one or more algorithms 1620 capable of fusing the data obtained from two or more of SAR module 110, RFID module 120, sensor module, 130, and map module 140.

In one embodiment, the one or more algorithms 1620 are configured to fuse imagery data generated/captured by SAR module 110 and digital map data from map module 140. That is, algorithm(s) 1620 may be configured to receive one or more captured images of a portion of the surface of the Moon (or Mars) and fuse (e.g., overlay) the captured images on a low-resolution digital map representation of the portion. For example, a low-resolution map generated by the Apollo Space Program, an Earth-orbiting satellite, a telescope, RADAR located on Earth, and/or the like may be fused (i.e., modified) with the high-resolution image captured/generated by SAR module 110 to generate a high-resolution digital map of the surface of the Moon (or Mars).

In another embodiment, the one or more algorithms 1620 are further configured to fuse the high-resolution digital map data modified by SAR module 110 with object location data obtained from RFID module 120 and/or object location data obtained from sensor module 130. That is, algorithm(s) 1620 may be configured to fuse (e.g., overlay) the location of objects associated with an RFID tag 1210 and/or detected by sensor module 130 with the high-resolution digital map in real-time. For example, the present location of a structure, vehicle, and/or the like object may be fused on to the high-resolution digital map of the surface of the Moon (or Mars or other celestial body) and displayed to the flight crew (via display 1510) such that the flight crew is able to locate a suitable place to land a spacecraft. That is, the high-resolution map provides the terrain features of the surface of the Moon, while the data obtained from RFID module 120 and/or sensor module 130 provides real-time location information for any objects that may be present on the surface of the Moon or other celestial body. The following discussion relating to the operation of system 100 may be beneficial in understanding the spirit and scope of the various embodiments of system 100.

Figure 2:
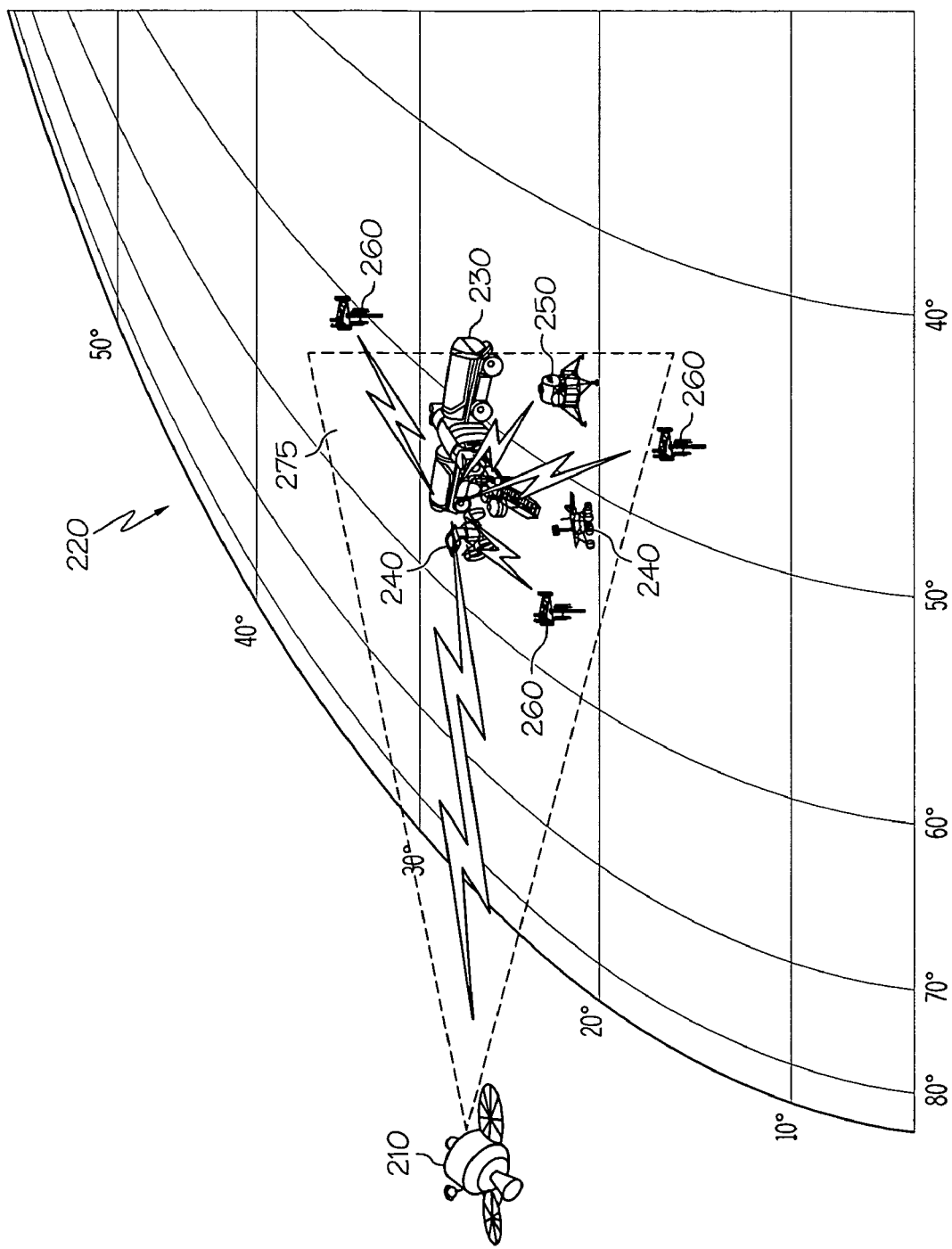
FIG. 2 is a diagram illustrating the operation of the system of FIG. 1 in accordance with one exemplary embodiment of the invention.

FIG. 2 is a diagram illustrating one example of the operation of one embodiment of system 100. This example does not limit the scope of system 100, but rather, is intended to provide one skilled in the art with a better understanding of how various embodiments of system 100 may be implemented.

As illustrated in the embodiment shown in FIG. 2, SAR module 110 is implemented on a crew exploration vehicle (CEV) 210 orbiting the Moon 220 (or Mars or other celestial body); however, SAR module 110 may be included as a portion of a satellite, space station, or other spacecraft orbiting a celestial body 220. Also illustrated in FIG. 2 are a variety of objects, and specifically, a space station 230, a plurality of vehicles 240, a landing module 250, and a plurality of communication antennas 260.

In one embodiment, system 100 operates by SAR module 110 capturing one or more high-resolution images of a pre-determined geographic area 275 of the celestial body's surface during each orbit of CEV 210 around the celestial body. Map module 140 also stores a low-resolution map 1410 of area 275. Fusion module 160 then updates/modifies low-resolution map 1410 with the image(s) captured by SAR module 110 after each orbit or after a pre-determined number of orbits (e.g., 2, 3, 4, or 5 orbits) to generate a high-resolution map (not shown) of the surface of area 275. The high-resolution map may then be stored in map module 140 and/or displayed on one or more displays 1510 included within CEV 210, space station 230, landing module 250, and/or on the Earth.

After the high-resolution map is generated, the high-resolution map may be populated in real-time with the present location of space station 230, vehicles 240, and communication antennas 260 obtained from RFID module 120 and/or sensor module 130. This may be done while landing module 250 is landing so that the flight crew of landing module 250 is able to locate a landing site that does not include any obstructions (i.e., terrain features and/or objects). Once landing module 250 has landed, the high-resolution map may be further constantly, substantially constantly, or periodically populated/updated in real-time to include the location of landing module 250 obtained from RFID module 120 and/or sensor module 130.

To obtain the location of space station 230, vehicles 240, landing module 250, and communication antennas 260 from RFID module 120, space station 230, vehicles 240, landing module 250, and communication antennas 260 each have a respective RFID tag 1210 attached to it. Likewise, sensor module 130 may constantly, substantially constantly, or periodically monitor area 275 to detect the present location of space station 230, vehicles 240, landing module 250, and communication antennas 260.

Although FIG. 2 does not specifically illustrate where the various components of system 100 are located, one skilled in the art will appreciate that the various components of system 100 may be located in any one or more of space station 230, vehicles 240, landing module 250, and on the Earth, provided that the various components of system 100 are capable of communicating with one another. That is, SAR module 110, RFID module 120, sensor module 130, map module 140, synthetic vision module 150, and fusion module 160 may each be located on space station 230, vehicles 240, landing module 250, or on the Earth, or portions of SAR module 110, RFID module 120, sensor module 130, map module 140, synthetic vision module 150, and fusion module 160 may be located in different ones of space station 230, vehicles 240, landing module 250, and on the Earth, except that landing module 250 will preferably include at least one display 1510 displaying the high-resolution map, with or without object location data obtained from RFID module 120 and/or sensor module 130 fused therein during landing.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A system for mapping a surface of a celestial body containing objects and terrain, comprising:
    a Synthetic Aperture RADAR (SAR) module configured to capture an image of the terrain of at least a portion of the surface;
    a map module configured to store map data representing the portion of the surface;
    a radio frequency (RFID) module configured to generate location data associated with corresponding objects on the surface; and
    a fusion module in communication with the SAR module, the RFID module, and the map module, wherein the fusion module comprises a processor configured to:
        receive the image and the map data,
        combine the image and the map data to generate a new map of the portion of the surface, and
        receive the location data and combine the location data with the map to generate a real-time map of the portion of the surface including a location of each object.

2. The system of claim 1, wherein the objects are man-made objects.

3. The system of claim 1, further comprising:
    a sensor module coupled to the fusion module, the sensor module configured to generate sensor data associated with corresponding objects, wherein the processor is further configured to receive the sensor data and combine the sensor data with the map to generate a real-time map of the portion of the surface including a location of each object.

4. The system of claim 3, wherein the data representing the objects comprises data representing man-made objects, natural objects, or both.

5. The system of claim 1, further comprising a vehicle capable of orbiting the celestial body, wherein the SAR module is housed on the vehicle and is configured to generate at least one image during each orbit.

6. The system of claim 1, wherein the processor is further configured to update the map data with the map.

7. A method for mapping a surface of a celestial body containing terrain and an object, the method comprising the steps of:
    orbiting the celestial body;
    capturing, via a Synthetic Aperture RADAR (SAR) module, an image of the terrain during each orbit;
    fusing, via a processor, the captured image with a map of the surface to generate a new map of the surface;
    locating an RFID tag on the object; and
    fusing, via the processor, location data obtained from the RFID tag with the new map to generate a real-time map including a location of the object.

8. The method of claim 7, further comprising the step of updating the real-time map with a new location of the object.

9. The method of claim 7, further comprising the steps of:
    detecting, via a sensor module, the location of the object; and
    fusing, via the processor, location data obtained from the sensor module with the real-time map.

10. The method of claim 7, wherein the fusing step comprises the step of updating the map with the new map.

11. The method of claim 7, wherein the fusing step is performed using information fusion.

12. A computer-readable medium storing instructions that, when read by a processor, cause the processor to perform a method comprising the steps of:
    receiving, from a Synthetic Aperture RADAR (SAR) module, an image of a terrain of at least a portion of a surface a celestial body during a plurality of orbits around the celestial body;
    fusing the captured image with map data representing the portion of the surface to generate a new map of the surface;
    locating an RFID tag on an object located in the portion of the surface; and
    fusing location data obtained from the RFID tag with the high-resolution map to generate a real-time map of the portion of the surface including a location of the object.

13. The computer-readable medium of claim 12, further comprising instructions that cause the processor to perform the step of updating the real-time map with a new location of the object.

14. The computer-readable medium of claim 12, further comprising instructions that cause the processor to perform the steps of:
    detecting the location, via a sensor, of the object; and
    fusing the location of the object with the real-time map.

15. The computer-readable medium of claim 14, further comprising instructions that cause the processor to perform the step of updating the real-time map with a new location of the object.

16. The computer-readable medium of claim 12, wherein the instructions that cause the processor to perform the fusion step further causes the processor to perform the step of updating the map data with the new map.

17. The computer-readable medium of claim 12, wherein the instructions that cause the processor to perform the fusion step further causes the processor to perform the fusion step using information fusion.

* * * * *